United States Patent [19]

Aoki

[11] 4,200,852
[45] Apr. 29, 1980

[54] MAGNETIC LOCKING APPARATUS

[75] Inventor: Yoshihiro Aoki, Tokyo, Japan

[73] Assignee: Application Art Laboratories Co., Ltd., Tokyo, Japan

[21] Appl. No.: 859,106

[22] Filed: Dec. 9, 1977

[30] Foreign Application Priority Data

Jul. 4, 1977 [DE] Fed. Rep. of Germany ....... 2730115

[51] Int. Cl.² .............................................. H01F 7/00
[52] U.S. Cl. ................................... 335/285; 24/201 B
[58] Field of Search .............. 335/285, 286; 24/201 B, 24/73 MS

[56] References Cited

U.S. PATENT DOCUMENTS

| 2,615,227 | 10/1952 | Hornik | 24/201 B |
| 2,654,929 | 10/1953 | Feibelman | 24/201 B |
| 2,861,831 | 11/1958 | Loeb | 335/285 |
| 2,943,246 | 6/1960 | Riordan | 335/285 |
| 3,009,225 | 11/1961 | Budreck | 24/201 B |
| 3,086,268 | 4/1963 | Chaffin, Jr. | 335/285 |
| 3,127,653 | 4/1964 | Budreck | 24/201 B |
| 4,021,891 | 5/1977 | Morita | 24/201 B |

Primary Examiner—Harold Broome
Attorney, Agent, or Firm—Wenderoth, Lind & Ponack

[57] ABSTRACT

An improved magnetic locking apparatus includes two elements which are magnetically attached, whereby the first magnetic supply element both magnetically attracts the second element and engages it for being coupled therewith. The construction of the two elements permits the elements to be securely attached against accidental external forces perpendicular to and parallel to the coupled surfaces of the elements.

8 Claims, 20 Drawing Figures

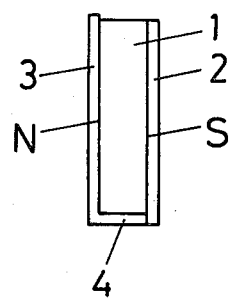
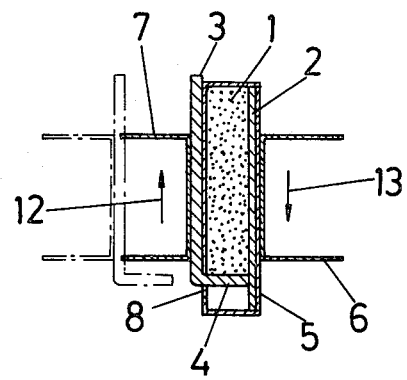
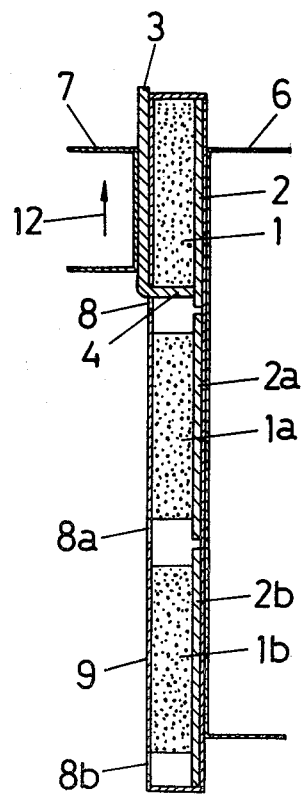
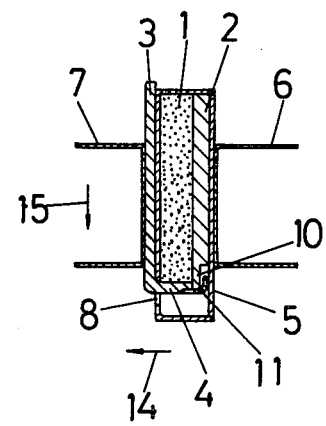

MAGNETIC LOCKING APPARATUS

BACKGROUND OF THE INVENTION

1. Field of the Invention

This invention relates generally to a fastening device, and more particularly to a magnetic locking apparatus of the type which includes two elements to be magnetically attached, wherein a first magnetic supply element both magnetically attracts the second element and engages it for being coupled therewith. When coupled together, the elements can resist all accidental external forces perpendicular to and parallel to the coupled surfaces.

2. Description of the Prior Art

There are known various types of devices using the magnetic attraction of a magnet for attaching two-part articles such as bags, clothes, shoes and the like. However, practically all such known devices depend solely upon the magnetic attraction which attaches their two component parts together, and therefore present disadvantages in that although the attraction between the device is relatively strong enough to resist external forces which are exerted parallel to the magnetic lines of force or perpendicular to the coupled surfaces of the two parts, such attraction tends to become less strong or resistant against forces across the magnetic lines of force or parallel to the surfaces, so that the two parts are easily displaced relative to each other and then disconnected. Those devices, which can resist the forces parallel to the magnetic lines of force, cannot overcome forces that are greater than the inherent magnetic attracting ability of the magnet. If the devices are to be made more resistant against such forces, they must employ costly, high-quality permanent magnets. This is not desirable from the aspect of economy. There are also known non-magnetic locking devices which accomplish the automatic locking function by means of a spring or an equivalent such as rubber, but those devices disadvantageously involve complex construction and improper working.

SUMMARY OF THE INVENTION

With the disadvantages and problems of the prior art cited above in view, it is accordingly one object of the present invention to provide an improved magnetic locking apparatus which permits two elements to be both magnetically attached and to engage each other so that the magnetic attachment of the two parts can be strengthened by the locking function.

It is another object of the present invention to provide an improved magnetic locking apparatus in which, when coupled together the two elements can resist any accidental external forces in all directions.

As noted from the above, the invention can be characterized in that two elements can be securely held together against all unexpected forces.

BRIEF DESCRIPTION OF THE DRAWINGS

Other objects and advantages of the invention will become apparent from the description which follows hereinafter and the appended claims by reference to the several preferred embodiments shown in the accompanying drawings, in which:

FIG. 1 is a schematic view of the apparatus embodying the invention, for the purpose of illustration of the principle on which the invention is based;

FIG. 2 is a sectional view of a preferred embodiment of the invention;

FIG. 3 is a sectional view of a variation of FIG. 2;

FIG. 4 is a sectional view of a further variation of FIG. 2;

DESCRIPTION OF THE PREFERRED EMBODIMENTS

Figure 5:
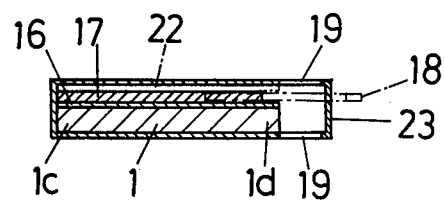
FIG. 5 is a sectional view of another preferred embodiment.
Figure 6:
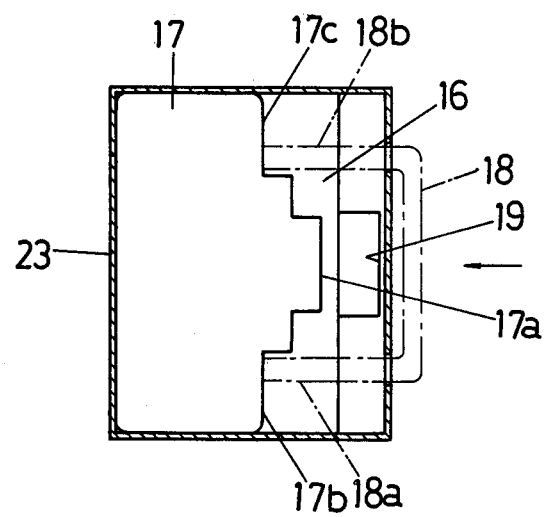
FIG. 6 is a partly broken-away plan view of FIG. 5.

The present invention will now be illustrated in more detail by showing several preferred embodiments and further modified forms thereof by reference to the accompanying drawings. Referring first to FIGS. 1 and 2, a permanent magnet 1 has sides S and N of opposite polarities as shown, one side S having an iron or other ferromagnetic stationary plate 2 rigidly secured thereto and the other side N having an iron or other ferromagnetic movable plate 3 removably attached thereto, movable plate 3 having an integral hooked portion 4 at the lower end which extends in parallel contact with the magnet 1 to the stationary plate 2 for contact therewith. The magnet 1 is enclosed with an enclosure or cover 5 of brass or synthetic resin material. As shown, the stationary plate 2 includes a pair legs 6 rigidly secured thereto for attaching the magnet part 1 and 2 to an article such as a bag, clothes, etc., and the movable plate 3 also has a pair of legs 7 rigidly secured thereto for the same purpose. The enclosure 5 has an aperture or opening 8 through which the hooked portion 4 of the movable plate 3 is inserted and which prevents the movable plate 3 from sliding displacement parallel to the contacted surfaces of the two plates 2 and 3.

FIG. 3 indicates a variation of the apparatus of FIG. 2, and in FIG. 3, a plurality of permanent magnets 1, 1a and 1b are spaced at regular intervals and are fixed to the corresponding stationary plates 2, 2a and 2b in an elongated enclosure 9 which in turn are also spaced at regular intervals and mounted to the inner wall of the enclosure 9. The enclosure 9 has regularly spaced apertures or openings 8, 8a and 8b through which the hooked portion 4 of the movable plate 3 is to be inserted and which are located in positions where the hooked portion 4 through any of the apertures has its upper face engaging the lower end of the respective magnet. The movable plate 3 can engage the stationary plates 2, 2a and 2b in a manner similar to that of the earlier described embodiment. The embodiments described above and shown in FIG. 2 and 3 depend solely upon the magnetic attraction of the magnet for their resistance to external forces which are exerted perpendicular to the coupled surfaces of the two plates or in parallel to the magnetic lines of force, or pulling forces to detach the two plates apart, while the embodiment of FIG. 4 shows an additional hooked portion which engages the stationary plate thereby further increasing the resistance to the pulling forces. In FIG. 4, the permanent magnet 1 includes a stationary plate 2 rigidly secured to the side S thereof as shown, and having a cutout or recess 10 at the lower edge thereof, and a movable plate 3 has a hooked portion 4 which has a further hooked portion 11 of non-ferromagnetic material engageable with the above-mentioned cutout 10 for forming a locking relationship with each other, thereby maintaining the two plates securely held together against any pulling forces as long as they are engaged. In the embodiments of FIGS. 1 to 3, the path of the magnetic lines of force supplied by the magnet 1 travel starting with the north pole N through the movable plate 3, hooked portion 4 and stationary plate 2 to the south pole S, so that the surfaces of contact of the two plates 2 and 3 have an increased magnetic attraction which urges the plate 3 toward the plate 2 while the hooked portion 4 of the plate 3 engages the lower end of the magnet 1. In this manner, the plates 2 and 3 are firmly held together by means of the increased magnetic attraction against any unexpected pulling forces, and are also locked by means of the hooked portion 4 engaging with the magnet 1 against the forces exerted as shown by arrow 12, while they are locked by means of the hooked portion 4 engaging the opening 8 of the enclosure 5 or 9 against the forces exerted as shown by arrow 13. In the embodiment of FIG. 4, the two plates 2 and 3 have a locked relationship such that they are firmly held together against the forces exerted as shown by arrow 14 perpendicular to their coupled surfaces by means of the hooked portion 11 which engages the cutout 10 of the stationary plate 2. Then, if the two plates are to be detached, it is necessary to displace the movable plate 3 for sliding movement in the direction of an arrow 15 relative to the stationary plate 2 and then to pull the plate 3 in the direction of arrow 14. As readily understood from the foregoing description by referring to FIGS. 1 to 4, the two plates 2 and 3 can firmly be held together when they are subjected to any unexpected external forces in all directions.

Figure 7:
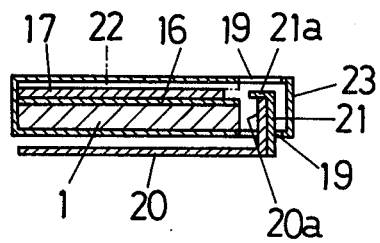
FIG. 7 is a sectional view of the apparatus of FIG. 5 illustrating the operation of the apparatus in which the two elements are placed in a pre-engagement state.
Figure 8:
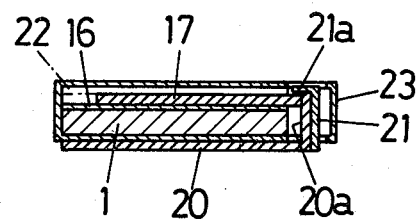
FIG. 8 is a sectional view showing the two elements engaged.
Figure 9:
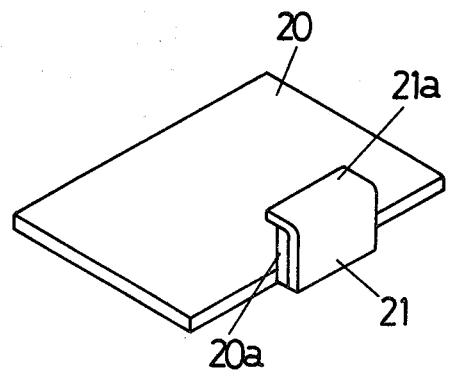
FIG. 9 is a perspective view of FIG. 5.

Referring next to FIGS. 5 to 9, a further preferred embodiment is described below. A permanent magnet 1 of a rectangular shape has a stationary plate 16 of brass material rigidly secured to one side thereof over which a movable plate 17 of iron is slidably placed. The movable plate 17 has a left-side edge portion which has the length of the corresponding edge of the stationary plate 16 and a central protruded edge portion 17a on the right side having symmetrical stepped portions 17b, 17c on opposite sides thereof. The stepped portions 17b and 17c are contacted by corresponding legs 18a and 18b of a lock release member 18. As particularly shown in FIG. 5, the magnet 1, stationary plate 16 and movable plate 17 are enclosed in an enclosure 23 of brass material such that there is a vacancy left on one side of the enclosure 23. The enclosure 23 has apertures or openings 19 on opposite sides thereof. A separate locking plate 20 of iron material has an integral rising portion 20a extending therefrom which is to be inserted into the aperture 19 of the enclosure 23. The rising portion 20a is backed by a plate 21 of brass material having a hooked portion 21a bent at the top of the rising portion 20a and slightly projecting therefrom. An additional plate 22 is interposed between the inner wall of the enclosure 23 and the plate 17, and is rigidly secured to the inner wall. The plate 22 aids in making the sliding movement of the plate 17 easier, but there would be no problem in this respect without the interposition of the plate 22. In the embodiment described of FIGS. 5 to 9, the magnet 1 and the movable plate 17 are placed relative to each other as shown in FIG. 5 when they are free from the locking plate 20. In other words, the movable plate 17 is retracted to the left in FIG. 5, and this retracted position of the plate 17 is caused by the fact that the plate 17 has a wider area in contact with the magnet 1 on the left side 1c than on the right side 1d so that the magnetic attraction on the left side 1c is greater than that on the right side 1d, thus allowing the former to overcome the latter. The above situation, or the retracted position of the plate 17 remains unchanged until the hooked portion 21a of the locking plate 20 which is inserted into the aperture 19 reaches the upper face of the magnet 1 on the right side 1d as shown in FIG. 7. As the locking plate 20 is further pushed inward to move its hooked portion 21a therewith beyond the thickness of the plate 17 over the magnet 1, the magnetic lines of force supplied by the magnet travel from the north pole of the magnet through the locking plate 20 and the rising portion 20a to the central protruded edge 17a of the plate 17 so that the plate 17 can be attracted to the rising portion 20a for sliding movement toward the right as shown in FIG. 8. Thus, the protruded edge 17a of the plate 17 can engage the hooked portion 21a of the plate 21, and the locking plate 20 and the plate 17 are locked and firmly held together. The two elements thus locked will not be detached even though the elements as a whole are subjected to forces such as shock, swing or the like or even if external forces are accidentally exerted to pull the locking plate 20 apart from the plate 17. Then, in order to unlock or disengage the locking plate 20 from the plate 17, it is only necessary to depress the lock release member 18 in the direction of the arrow, as shown by the broken lines in FIG. 6. Thus, the movable plate 17 slides in the direction of the arrow under the pushing force of the member 18, thereby disengaging the protruded edge 17a from the hooked portion 21a. With the edge 17a and the portion 21a apart, the locking plate 20 is then pulled to move the hooked portion 21a completely clear of the plate 17 so that the plate 17 is moved to the left side in FIG. 7 under the magnetic attraction of the magnet 1 which is relatively greater than on the right side. At this moment, the lock is again placed in a ready position, and the locking can be performed by the procedures described above. The embodiment shown in FIGS. 5 to 9 has advantages since the elements can firmly be held together against any accidental external forces.

Figure 10:
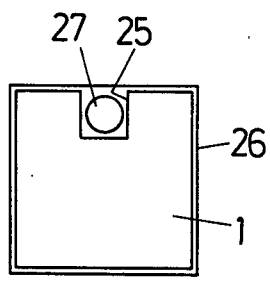
FIG. 10 is a plan view of a modified form of the apparatus with the stationary plate attached to one side of the magnet, not shown.
Figure 11:
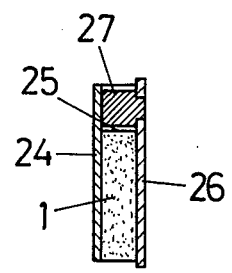
FIG. 11 is a sectional view of FIG. 10.
Figure 12:
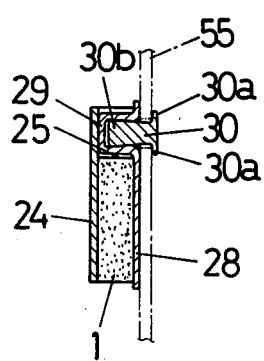
FIG. 12 is a sectional view of a variation of the apparatus of FIG. 10.

A variation shown in FIGS. 10 and 11 includes a permanent magnet 1 having a ferromagnetic plate 24 rigidly secured to one side thereof. The magnet 1 has a cutout 25 as shown in FIG. 10, with the plate 24 not shown therein for convenience of illustration. A movable plate 26 of non-ferromagnetic material has a ferromagnetic rod 27 securely affixed thereto which engages the cutout 25 of the magnet 1. Thus, when the two parts 1 and 24 engage each other, the surfaces of contact magnetically attract each other thus restricting the plate 26 from movement perpendicular to the surfaces by means of the magnetic attraction, while the lateral movement of the plate 26 in parallel with the surfaces is restricted by means of the rod 27 which both engages the cutout 25 and is attracted by the centered magnetic lines of force which pass through the rod 27. In this manner, the two parts are locked. FIG. 12 indicates a further modified form in which a permanent magnet 1 is backed on one side with a ferromagnetic plate 24 which is rigidly secured thereto, and a separate locking member is provided which consists of a ferromagnetic rod 30 having at one end a flanged portion 30a which is fastened to one part of an article 55 and having a shank 30b the diameter of which increases toward the other end, and a nonferromagnetic plate 28 having a recessed portion 29 by which the shank 30b of the rod 30 is firmly held by choking or squeezing means and which removably fits in the cutout portion 25 of the magnet 1. Thus, as coupled together, the two elements are magnetically attracted to each other by the centered magnetic lines through the portions 25 and 29, and are also locked by the portions 25 and 29.

Figure 13:
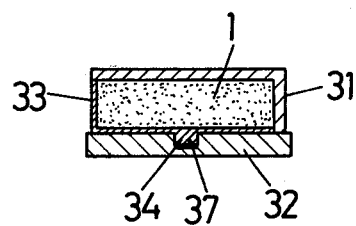
FIG. 13 is a sectional view of a further modified form.
Figure 14:
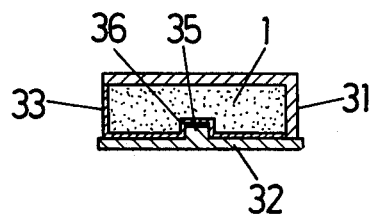
FIG. 14 is a sectional view of a variation of the apparatus of FIG. 13.

FIGS. 13 and 14 show two modified forms. In FIG. 13, a permanent magnet 1 has a ferromagnetic plate 31 rigidly secured to one side thereof and a ferromagnetic plate 33 covering the magnet 1 and having a protruded portion 34 centrally thereof. A separate plate 32 of ferromagnetic material has a central recessed portion 37 which engages the protruded portion 34 of the plate 33. In FIG. 14, the construction is generally similar to that in FIG. 13 except that the separate plate 32 has a central protruded portion 35, while the plate 33 has a central recessed portion 36 engageable with the portion 35. The functions of the devices in FIGS. 13 and 14 are substantially the same as the earlier embodiments described hereinbefore.

Figure 15:
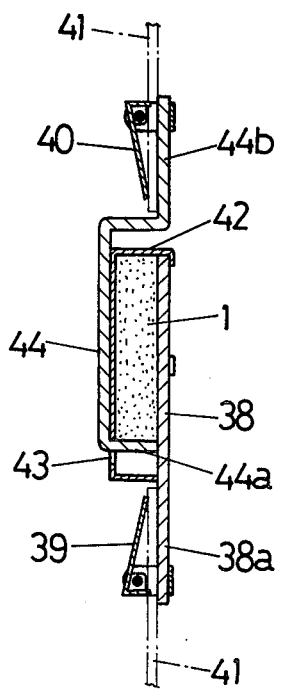
FIG. 15 is a sectional view of a modification of the apparatus of FIG. 2.

FIG. 15 indicates a modified embodiment of the apparatus in FIG. 2, and its construction and function are similar to those in FIG. 2. In FIG. 15, a permanent magnet 1 has a ferromagnetic plate 38 rigidly secured to one side thereof and having an extended portion 38a which carries a pivotted retaining lever 39 which tightly holds one end of a waist band 41, for example. The magnet 1 has a nonferromagnetic plate 42 rigidly secured to the other side thereof, the plate 42 having an opening 43 through which a hooked portion 44a of a separate plate 44 of ferromagnetic material is to be inserted. The plate 44 has an extended portion 44b carrying a pivotted retaining lever 40 which tightly holds the other end of the band 41. The apparatus in FIG. 15 functions similarly to that of FIG. 2 and as noted, is employed as a trouser belt or suspender buckle.

Figure 16:
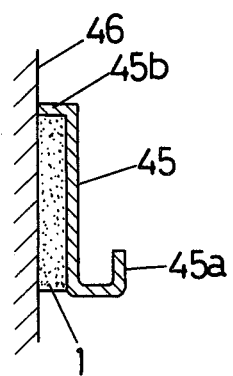
FIG. 16 is a sectional view of a further preferred embodiment.
Figure 20:
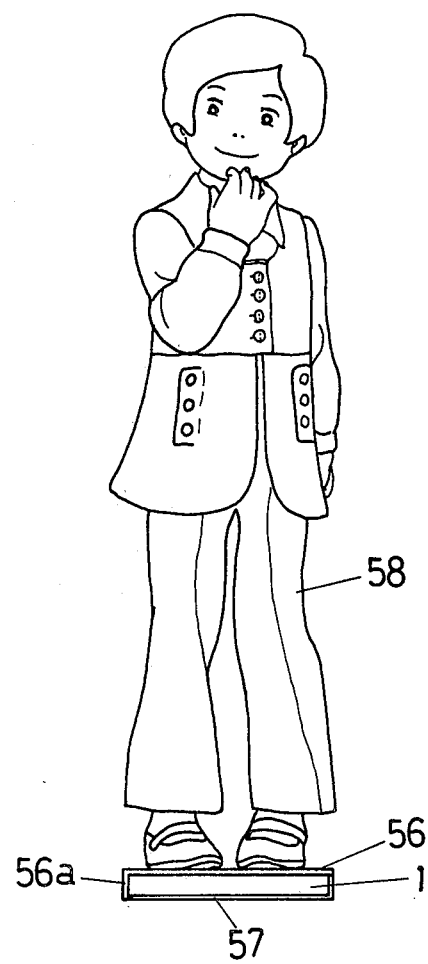
FIG. 20 is a front view of a variation of FIG. 16 without the hooked portion 45a and showing an example of use in which a doll is mounted.

A further variation is shown in FIG. 16 and includes a permanent magnet 1 having a plate 45 secured to one side thereof, plate 45 having a crooked portion 45b at the upper end and a hook portion 45a at the other end. The other side of the magnet 1 is exposed for being removably attached to a wall portion 46 of ferromagnetic material. As thus constructed, the device in FIG. 16 can be securely or immovably attached to the wall portion 46 for supporting an article at the hook portion, while it is easy to remove the device from the wall 46 when the side of the hook portion 45a is pulled away from the wall as the side of the crooked portion 45b acts as a fulcrum. On the other hand, it is very hard to remove the device away from the wall by pulling the side of the crooked portion 45b on the fulcrum of the other side. This is because the side 45b is magnetically attached to the wall more strongly than the side 45a. The device in FIG. 16 can provide the two functions which, on the one hand, securely attach the device to the wall, and on the other hand facilitates removal of the device when it is pulled away about the fulcrum at 45b. FIG. 20 indicates a device modified from that in FIG. 16 without the hook portion 45a and instead with a doll 58 thereon as a typical use thereof. The device in FIG. 20 has the same construction and functions as that in FIG. 16, elements 56, 56a and 57 corresponding to elements 45, 45b and 46 of FIG. 16, and for avoidance of redundance, reference should be made to the description of FIG. 16 for details of the operation thereof.

Figure 17:
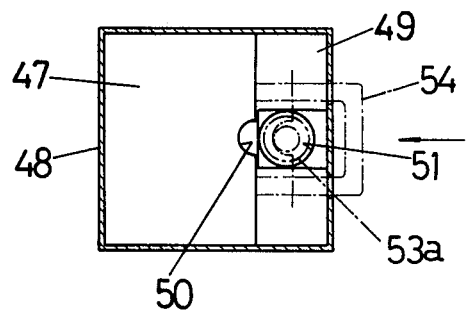
FIG. 17 is a plan view of a variation of the apparatus of FIG. 5.
Figure 18:
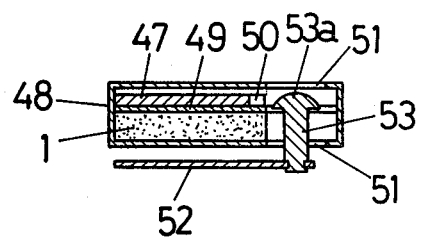
FIG. 18 is a sectional view of the device of FIG. 17 showing the two elements unlocked.
Figure 19:
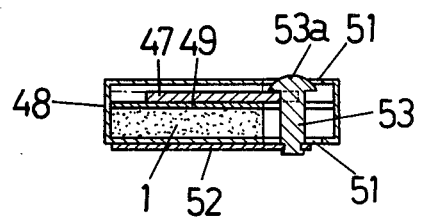
FIG. 19 is a sectional view of the device of FIG. 17 showing the two elements locked.

FIGS. 17 to 19 illustrate a modified form of the apparatus of FIGS. 5 to 9. A permanent magnet 1 is enclosed with a nonferromagnetic cover 48, and has a stationary plate 49 of nonferromagnetic material rigidly secured to the surface on one side thereof. A movable ferromagnetic plate 47 is provided for sliding movement over the plate 49 and has a central cutout edge 50 on one side thereof. The cover 48 has upper and lower apertures 51 through which a locking rod 53 of a separate plate 52 of ferromagnetic material is to be inserted. The locking rod 53 is rivetted to the plate 52 as shown, and has a rounded head 53a of nonferromagnetic material. Reference numeral 54 designates a lock release member shown by broken lines. The locking and lock releasing operations are functionally performed in the same manner as described above regarding FIGS. 5 to 9.

All the preferred embodiments and modified forms thereof illustrated hereinbefore are structurally and functionally based on the same principle of operation, and have various applications and uses as fastening devices such as detachably attaching two-part articles which include handbags, clothes, hangers, etc. Particular uses may be found in electrical connecting apparatus such as a plug-receptacle assembly, earthing connectors and the like. In this case, it is apparent that the consitituent elements which constitute electrical contacts are made of electrically conducting materials.

In accordance with the present invention described herein, the locking condition of the two-part apparatus can be maintained by both the magnetic attraction of the magnet and the locking function of the two elements. Unlocking of the two elements, on the other hand, can readily be performed by the intended manual operation, though an unexpected unlocking is avoided when any accidental external forces are applied.

Although the invention has been described by reference to the various preferred embodiments and modifications thereof, it should be understood that various changes and modifications may be made without departing from the spirit and scope of the invention.

What I claim is:
1. A magnetic locking apparatus comprising:
   at least one permanent magnet having first and second opposite side surfaces and an end surface extending between said first and second side surfaces;

a first ferromagnetic member on said first side surface of said permanent magnet, said first ferromagnetic member having an end portion extending outwardly beyond said end surface of said permanent magnet;

nonferromagnetic material enclosing said permanent magnet and covering said second side surface of said permanent magnet, said nonferromagnetic material being spaced from said end surface of said permanent magnet to define therebetween a chamber, said nonferromagnetic material having an aperture therethrough into said chamber; and a second ferromagnetic member removably mounted on that portion of said nonferromagnetic material covering said second side surface of said permanent magnet, said second ferromagnetic member having a hook portion extending through said aperture and said chamber into contact with said end portion of said first ferromagnetic member, said aperture and said chamber having a substantially greater thickness than said hook portion.

2. An apparatus as claimed in claim 1, wherein said first ferromagnetic member is fixedly secured to said first side surface of said permanent magnet, and said hook portion of said second ferromagnetic member is in contact with said end surface of said permanent magnet and in abutment with said end portion of said first ferromagnetic member.

3. An apparatus as claimed in claim 2, wherein said end portion of said first ferromagnetic member has therein, on a side thereof facing away from said hook portion, a recess, and said hook portion has fixed thereto a nonferromagnetic hook member fitting into said recess.

4. An apparatus as claimed in claim 1, comprising a plurality of axially aligned said permanent magnets, said nonferromagnetic material enclosing all of said permanent magnets and having therein a plurality of said apertures.

5. An apparatus as claimed in claim 1, wherein said first ferromagnetic member is slidably positioned at said first side surface of said permanent magnet between a first position whereat said end portion extends outwardly beyond said end surface of said permanent magnet and a second position whereat said end portion is located inwardly of said end surface of said permanent magnet, said hook portion includes an outer nonferromagnetic hooked member adapted to engage over and lock onto said end portion of said first ferromagnetic member when said first ferromagnetic member is in said first position thereof, and further comprising a release member insertable into said chamber for pushing said first ferromagnetic member from said first position thereof to said second position thereof to thereby release engagement of said hooked member from said end portion of said first ferromagnetic member.

6. An apparatus as claimed in claim 5, wherein the area of said first ferromagnetic member adjacent said end portion is less than at the opposite end thereof.

7. An apparatus as claimed in claim 5, wherein said end portion of said first ferromagnetic member has therein a cutout edge into which fits said hooked portion of said second ferromagnetic member when said first ferromagnetic member is in said first position thereof.

8. An apparatus as claimed in claim 1, wherein said end portion of said first ferromagnetic member has thereon a first retaining member for attachment to an article, such as a belt, and said second ferromagnetic member, on an end thereof opposite from said hook portion, has a second retaining member for attachment to such article.

* * * * *